United States Patent
Kim et al.

(10) Patent No.: US 11,486,777 B2
(45) Date of Patent: Nov. 1, 2022

(54) FBG-BASED TORSION SENSOR DEVICE

(71) Applicant: KOREA INSTITUTE OF SCIENCE AND TECHNOLOGY, Seoul (KR)

(72) Inventors: Jinseok Kim, Seoul (KR); Sungwook Yang, Seoul (KR); Min Su Jang, Seoul (KR); Jun Sik Kim, Seoul (KR); Kyumin Kang, Seoul (KR); Bum-Jae You, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 13 days.

(21) Appl. No.: 17/259,636

(22) PCT Filed: Jul. 10, 2019

(86) PCT No.: PCT/KR2019/008493
§ 371 (c)(1),
(2) Date: Jan. 12, 2021

(87) PCT Pub. No.: WO2020/013601
PCT Pub. Date: Jan. 16, 2020

(65) Prior Publication Data
US 2021/0293636 A1    Sep. 23, 2021

(30) Foreign Application Priority Data
Jul. 12, 2018  (KR) .......................... 10-2018-0081178

(51) Int. Cl.
*G01L 1/24*    (2006.01)
*G01L 3/12*    (2006.01)

(52) U.S. Cl.
CPC ................ *G01L 3/12* (2013.01); *G01L 1/246* (2013.01)

(58) Field of Classification Search
CPC ......... G01L 3/12; G01L 1/246; G01L 3/1421; G01L 5/0061; G01L 5/24; G01L 11/025
See application file for complete search history.

(56) References Cited

U.S. PATENT DOCUMENTS 7,418,185 B2 *  8/2008  Lee .................... G01M 5/0008
                                          385/137
7,495,750 B2 *  2/2009  Hwang .................. G01B 11/18
                                          356/614

(Continued)

FOREIGN PATENT DOCUMENTS

CN      1442724 A    9/2003
JP      H041543 A    1/1992

(Continued)

OTHER PUBLICATIONS

Weigang Zhang et al., "Temperature-Independent FBG-Type Torsion Sensor Based on Combinatorial Torsion Beam", IEEE Photonics Technology Letters, Aug. 2002, pp. 1154-1156, vol. 14, No. 8.

(Continued)

*Primary Examiner* — Freddie Kirkland, III
(74) *Attorney, Agent, or Firm* — Rabin & Berdo, P.C.

(57) ABSTRACT

Embodiments relate to a torsion sensor device which measures a degree of torsion of a measurement object by using a fiber Bragg gratings (FBG) sensor, the sensor device comprising: an FBG sensor including a sensing unit formed in one section of an elongated optical fiber; and a fixing device for fixing and supporting the FBG sensor to cause displacement of the FBG sensor according to motion of the measurement object, wherein the fixing device includes a bending prevention member to enable the sensing unit to have torsion displacement without bending displacement, according to the motion of the measurement object.

8 Claims, 6 Drawing Sheets

(56) References Cited

U.S. PATENT DOCUMENTS

| | | | |
|---|---|---|---|
| 10,545,060 B2 * | 1/2020 | Singer | G01L 1/246 |
| 10,620,066 B2 * | 4/2020 | Blumenkranz | A61B 34/30 |
| 2005/0253051 A1 | 11/2005 | Hwang et al. | |
| 2006/0204199 A1 * | 9/2006 | Lee | G01D 5/35303 |
| | | | 385/137 |
| 2009/0201503 A1 | 8/2009 | Bennion et al. | |
| 2018/0136058 A1 | 5/2018 | Singer et al. | |

FOREIGN PATENT DOCUMENTS

| | | | |
|---|---|---|---|
| JP | 2002162211 A | 6/2002 |
| KR | 1020040078871 A | 9/2004 |
| KR | 1020060061564 A | 6/2006 |
| KR | 1020090087600 A | 8/2009 |
| KR | 101481814 B1 | 1/2015 |
| WO | 2005010462 A1 | 2/2005 |
| WO | 2008007062 A2 | 1/2008 |

OTHER PUBLICATIONS

Ran Xu et al., "Curvature, Torsion, and Force Sensing in Continuum Robots Using Helically Wrapped FBG Sensors", IEEE Robotics and Automation Letters, Jul. 2016, pp. 1052-1059, vol. 1, No. 2.
Binbin Song et al., "Highly sensitive twist sensor employing Sagnac interferometer based on PM-elliptical core fibers", Optics Express, Jun. 15, 2015, pp. 15372-15379. vol. 23, No. 12.
Extended European Search Report of EP 19834451.7 dated Feb. 23, 2022.
Chinese Office Action in the counterpart of Chinese patent application No. 201980056511.6 dated May 26, 2022.

* cited by examiner

FBG-BASED TORSION SENSOR DEVICE

TECHNICAL FIELD

The present disclosure relates to a torsion sensor device, and more particularly, to a sensor device for measuring axial torsion of a measurement object based on a fiber Bragg grating (FBG) sensor.

DESCRIPTION OF GOVERNMENT-FUNDED RESEARCH AND DEVELOPMENT

This research is conducted by Korea Institute of Science and Technology under the support of global frontier research project (Supervised by National Research Foundation of Korea, Project Series No. 1711073374) of the Ministry of Science and ICT.

BACKGROUND ART 3D motion capture systems are used in a variety of fields including sports, robotics, medical applications, games and graphics & animation all over the world, and there is a gradually increasing trend of the global market size using 3D motion capture systems.

To implement 3D motion capture systems, there is a need for technology development for systems for simultaneously measuring full body (including upper body and lower body) motions and finger motions in real time, and research and development of various types of products is now being conducted.

Detection of human's full body (including upper and lower bodies) motions or finger motions using an optical sensor using markers, an inertial sensor, an electromyography (EMG) sensor, a video camera, a location detection encoder and variable resistance has been studied and commercialized, and the inertial sensor has drift accumulated over time, the optical sensor using markers and the location detection encoder have some areas impossible to measure due to shadow areas, and the EMG sensor has errors caused by attachment and external mistakes.

Recently, to overcome these disadvantages, attempts have been made to detect various human motions using FBG sensors. For example, FBG sensors may be used as strain sensors to measure tensile forces applied to the axial direction of a measurement object, may be used as shape sensors to measure the direction and the degree of bending occurred in the measurement object, and may be used as tiltmeters to detect the tilt in the measurement object.

Human bodies move, bend and are tilted, and even twisted in the axial direction like arm movements. Therefore, to measure human body motions more precisely, it is necessary to measure torsion of the human bodies.

However, there are not many developed sensors for measuring axial twisting motions using FBG, and when shear forces by twisting are applied to FBG, forces by bending and tension are also transmitted at the same time, so it is difficult to separate the complex forces.

Additionally, there are some cases of numerical approaches of methods for individually distinguishing the results of complex reflected wavelength generated by bending and twisting, but since changes in wavelength by bending are much larger than changes in wavelength by twisting, there are high risks of errors due to the real-time classification operation. Accordingly, in the actual application to real-time 3D motion capture systems, there are limitations in numerically classifying and distinguishing a huge amount of wavelength change data and sending back location, angle or torsion information to graphical user interfaces (GUI) or actual models.

RELATED LITERATURES (Patent Literature 1) Korean Patent Publication No. 10-2006-0061564

DISCLOSURE

Technical Problem

An aspect of the present disclosure relates to a torsion sensor device, and specifically, proposes a fiber Bragg grating (FBG)-based sensor device for measuring the degree of axial torsion.

Technical Solution

According to an aspect of the present disclosure, there is provided a torsion sensor device which measures a degree of torsion of a measurement object by using a fiber Bragg grating (FBG) sensor, the torsion sensor device comprising an FBG sensor including a sensing unit formed in one section of an elongated optical fiber, and a fixing device for fixing and supporting the FBG sensor to cause displacement of the FBG sensor according to motion of the measurement object, wherein the fixing device includes a bending prevention member to enable the sensing unit to have torsion displacement without bending displacement, according to the motion of the measurement object.

According to an embodiment, the bending prevention member may include two supports to support the FBG sensor to allow the torsion displacement of the sensing unit, and a reinforcer connecting the two supports to prevent a relative bending movement between each support.

According to an embodiment, the reinforcer may be a tube which wraps around the sensing unit.

According to an embodiment, the fixing device may further include a beam to which the FBG sensor is attached, wherein the beam makes a twisting motion in response to a twisting movement of the measurement object, and the beam may be positioned across the two supports and fixed to the supports.

According to an embodiment, the support may be a ball bearing, the beam may be fixed to an inner ring of the ball bearing, and the reinforcer may be fixed to an outer ring of the ball bearing.

According to an embodiment, the sensing unit may be spirally wound on an outer periphery of the beam between the supports.

According to an embodiment, the beam includes a torsion beam on which the sensing unit is spirally wound and an extension beam extending from two ends of the torsion beam to fix the FBG sensor, and the torsion beam is formed with a larger diameter than the extension beam.

According to an embodiment, the fixing device further includes a fixing member disposed at two ends of the beam and attached to the measurement object to fix the torsion sensor device to the measurement object.

According to an embodiment, the fixing member includes a fixture which is fixed to the measurement object, and a key member which is inserted into a slit formed in the fixture.

According to an embodiment, the key member includes a body part to which the beam is fixed, and a rotation prevention part to prevent the key member from rotating relative to the fixture.

According to an embodiment, the fixing members may be formed at the two ends of the beam include a first fixing member fixed to the beam, and a second fixing member may not be fixed to the beam so that the beam slidably moves relative to the second fixing member.

BEST MODE

Figure 1A:
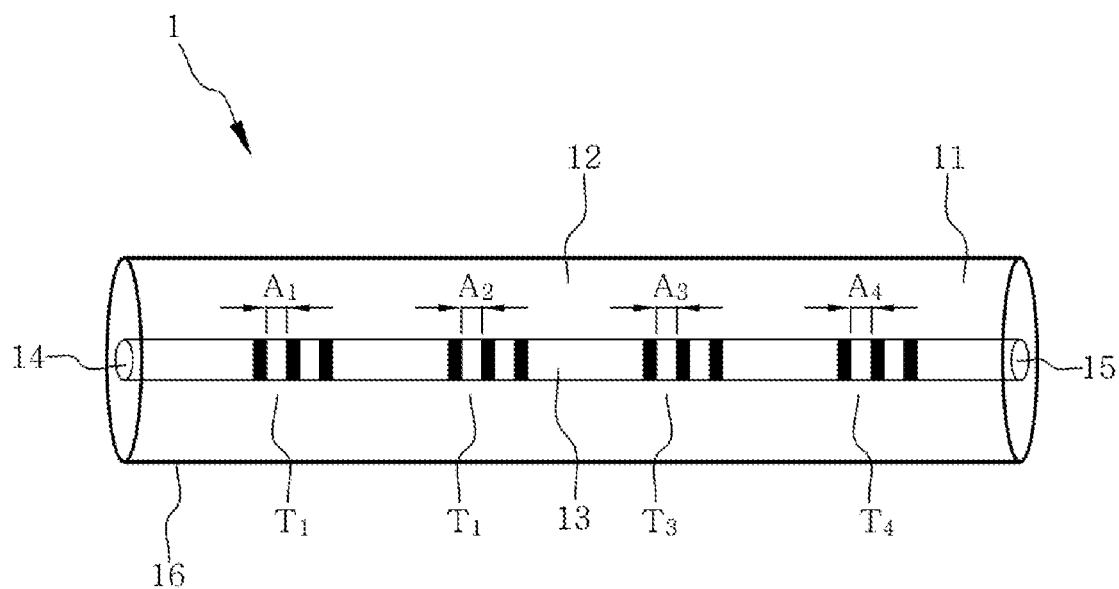
FIG. 1A is a diagram schematically showing the structure of a fiber Bragg grating (FBG) sensor according to an embodiment.

Embodiments will be described with reference to the accompanying drawings. However, the principles disclosed herein may be embodied in many different forms and it should be understood that the disclosure is not limited to the embodiments disclosed herein. In the detailed description of the present disclosure, a detailed description of well-known features and technologies may be omitted to avoid unnecessary ambiguity of the features of the embodiments.

In the drawings, the reference numbers indicate the elements. The shapes, sizes and areas in the drawings and the like may be exaggerated for clarity.

A measurement object refers to a variety of objects including, for example, humans, animals, machine and robots, which can make motions and/or movements of all or part of the object.

The term 'bend' or 'bent' as used herein represents that after bending, the axial central axis of the measurement object deviates from the axial central axis before bending. In the specification, 'bending movement', 'bending action' or 'bending motion' of the measurement object refers to movement and/or motion of the measurement object or movement and/or motion of a third party, causing bending to occur in all or part of the measurement object.

The term 'twisted' or 'twist' as used herein represents that the axial central axis after twisting does not deviate from the axial central axis before twisting, and rather, cross sections rotate around the axial central axis. In the specification, 'twisting movement', 'twisting action' or 'twisting motion' of the measurement object refers to movement and/or motion of the measurement object or movement and/or motion of a third party, causing twisting to occur in all or part of the measurement object. In the specification, twisting includes torsion.

In the specification, 'bending displacement' of a fiber Bragg grating (FBG) sensor refers to grating interval displacement of the FBG sensor occurred by 'bending motion' and/or 'bending movement' by the measurement object and/or the third party.

In the specification, 'torsion displacement' of the FBG sensor refers to grating interval displacement of the FBG sensor occurred by 'twisting motion' and/or 'twisting movement' by the measurement object and/or the third party.

Hereinafter, a detailed description of the embodiments of the present disclosure will be provided with reference to the accompanying drawings.

To help understanding, a fiber Bragg grating (FBG) sensor 1 will be first described.

FIG. 1A is a diagram schematically showing the structure of the FBG sensor 1 according to an embodiment.

The FBG sensor 1 includes a plurality of gratings $T_1$ to $T_4$ formed in one section of an elongated optical fiber 11. In the specification, the section of the optical fiber 11 having the plurality of gratings are referred to as a "sensing unit 16".

Although FIG. 1A mainly shows the sensing unit 16 for convenience, it will be understood that the remaining region of the optical fiber 11 not including gratings may extend to the left and right sides of the sensing unit 16. The remaining region of the optical fiber 11 extending to the left and right sides of the sensing unit 16 acts as a passage for transmitting light into the optical fiber 11, and the length and displacement does not affect the movement detection. In other words, the length of the remaining region of the optical fiber 11 other than the sensing unit 16 may be adjusted as needed, and the extension direction may be variously adjusted.

According to this embodiment, the optical fiber 11 includes a cladding 12 formed from glass and capable of freely flexing, and a core 13 formed along the lengthwise direction of the cladding 12 at the center of the cladding 12. The refractive index of the cladding 12 and the refractive index of the core 13 are different from each other. For example, the refractive index of the cladding 12 is $n_1$, and the refractive index of the core 13 is $n_0$ that is different from $n_1$. The optical fiber 11 has, at two ends, a light entrance 14 through which light enters from a light source (not shown) and a light exit 15 through which light exits via the core 13.

The core 13 in some regions of the optical fiber 11 has a plurality of grating nodes $T_1$-$T_4$, each grating node including a set of n (n≥2, a natural number) gratings, to form the sensing unit 16.

The gratings are where the properties of parts of the core 13 change through ultraviolet light in the fabrication process of the optical fiber 11, and have a different refractive index (for example, $n_0+\Delta n$) from the cladding 12 and the core 13.

The plurality of gratings is arranged at intervals $\Lambda$ between the gratings. The intervals $\Lambda$ between the gratings may be various. For example, the grating intervals $\Lambda$ may be equal. Alternatively, when the FBG sensor includes n gratings, n−1 grating intervals $\Lambda_1, \Lambda_2, \ldots \Lambda_a, \ldots \Lambda_{n-1}$ may be different from each other. For example, the intervals $\Lambda_1$-$\Lambda_4$ between each grating of each grating node $T_1$-$T_4$ may have a gradually increasing relationship (i.e., $\Lambda_1<\Lambda_2<\Lambda_3<\Lambda_4$). The interval between each grating node is so much larger than the intervals $\Lambda_1, \Lambda_2, \Lambda_3, \Lambda_4$ between the gratings of the grating nodes.

According to the above-described configuration, incident light entering the light entrance 14 of the optical fiber 11 undergoes interference by the grating nodes. The reflected light outputted back through the light entrance 14 exhibits wavelength spectrum having peaks corresponding to each grating node.

Figure 1B:
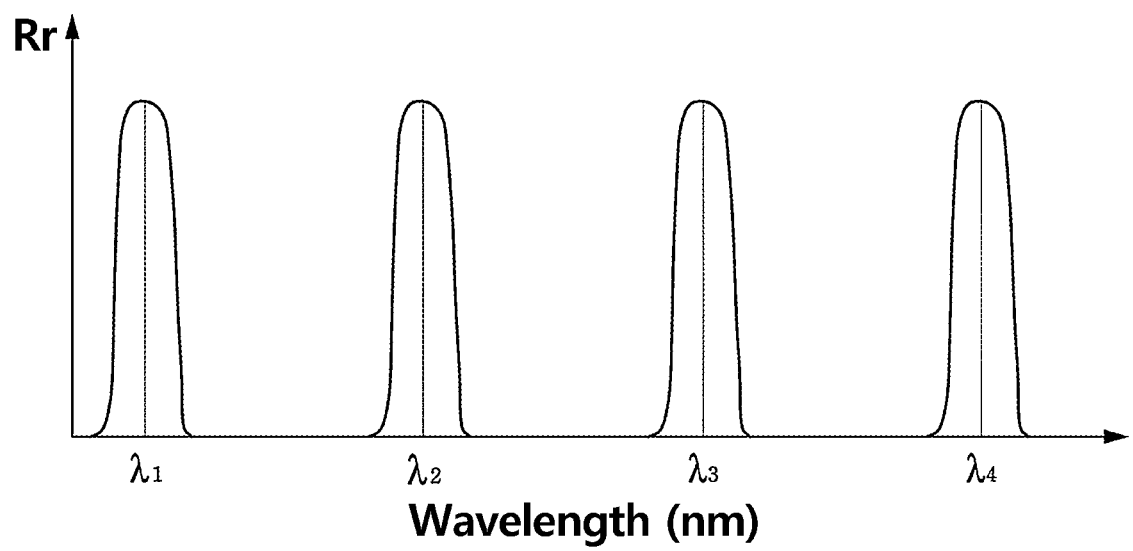
FIG. 1B is a graph showing the wavelength spectrum of reflected light outputted to a light entrance of the FBG sensor of FIG. 1A.

FIG. 1B is a graph showing the wavelength spectrum of the reflected light outputted through the light entrance 14 of the FBG sensor 1 of FIG. 1A.

The grating interval $\Lambda$ of the grating nodes and the wavelength $\lambda_B$ of the reflected light have a relationship of the following [Equation 1].

$$\lambda_B = 2 \cdot n_{eff} \cdot \Lambda \qquad \text{[Equation 1]}$$

Here, $n_{eff}$ is an indicator indicating the effective refractive index of the core.

The wavelengths $\lambda_1$, $\lambda_2$, $\lambda_3$, $\lambda_4$ shown in the wavelength spectrum of FIG. 1B correspond to values obtained by substituting the intervals $\Lambda_1$, $\Lambda_2$, $\Lambda_3$, $\Lambda_4$ between the gratings of each grating node into the above [Equation 1]. In other words, each of the wavelengths $\lambda_1$, $\lambda_2$, $\lambda_3$, $\lambda_4$ exhibits the wavelength of the reflected light reflected and outputted by each one grating node.

When strain is generated on the FBG sensor 1 at the location of the first grating node $T_1$, the interval $\Lambda_1$ between the gratings of the first grating node $T_1$ will change, and accordingly, the leftward and rightward shift of the curve of the reflected wavelength $\lambda_1$ among the wavelength spectrums of FIG. 1B may be measured by the relationship of the above [Equation 1]. Accordingly, when the leftward and rightward shift of the curve of the reflected wavelength $\lambda_1$ is measured, it may be determined that strain on the FBG sensor 1 at the location of the first grating node $T_1$.

In general, when the measurement object moves with the FBG sensor being mounted on the measurement object, the movement of the measurement object may cause bending displacement and/or torsion displacement of the FBG sensor 1 together. In this case, wavelength change information may include information associated with the degree of torsion of the measurement object as well as the degree of bending. Therefore, to measure only the degree of torsion of the measurement object through the FBG sensor 1, it is necessary to prevent the bending displacement of the FBG sensor 1.

In the present disclosure, the wavelength change information measured while preventing the bending displacement of the FBG sensor 1 indicates information associated with only twisting movement in the general movement of the measurement object, as described below.

Figure 2:
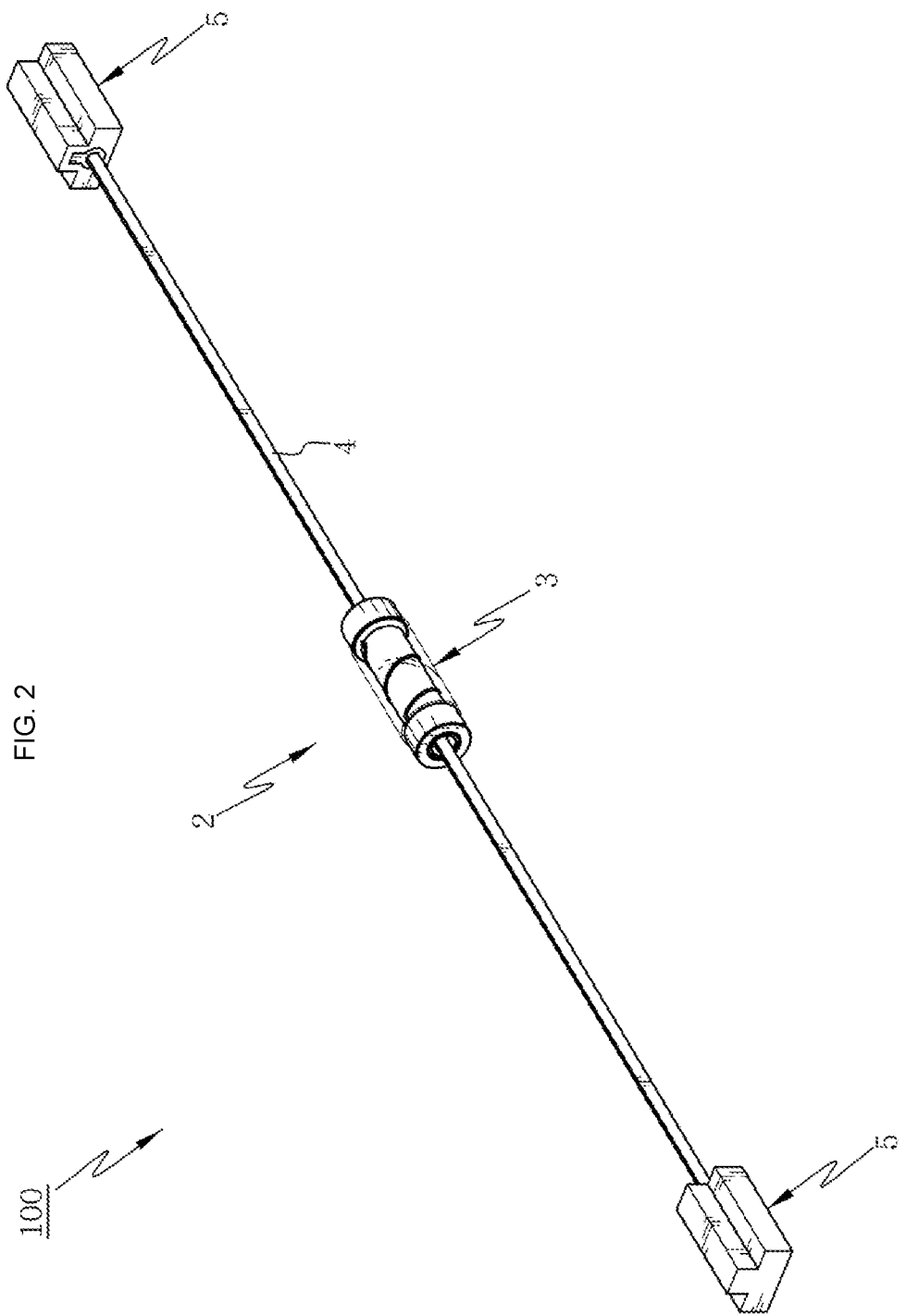
FIG. 2 is a perspective view of a torsion sensor device according to an embodiment.

FIG. 2 is a perspective view of the torsion sensor device 100 according to an embodiment of the present disclosure.

As shown in FIG. 2, the torsion sensor device 100 according to this embodiment includes an FBG sensor 1, and a fixing device 2 to fix and support the FBG sensor 1 to the measurement object (not shown) in order to cause displacement of the FBG sensor 1 with the movement of the measurement object.

The fixing device 2 incudes a beam 4 to which the FBG sensor 1 is attached and which makes a twisting motion at least in part in response to the twisting movement of the measurement object, and a fixing member 5 to fix the beam 4 to the measurement object.

According to this embodiment, the measurement object may be, for example, a human's arm. The elbow joint is a multi-degree of freedom joint in which a bending motion and/or a twisting motion occurs in combination during motion, and the torsion sensor device 100 according to this embodiment mechanically separates the twisting motion from the elbow's motion and measures the degree of torsion of the elbow joint.

To this end, the fixing device 2 according to this embodiment includes a bending prevention member 3 to allow the FBG sensor 1 to cause torsion displacement without bending displacement according to the movement of the measurement object.

As shown in FIG. 2, the fixing member 5 is formed at two ends of the torsion sensor device 100. The two fixing members 5 are each attached to a user's upper and lower arms (for example, fixed to the user's clothes). The beam 4 extends between the two fixing members 5 and runs across the user's elbow.

The beam 4 is made of, for example, a polymer material and has flexibility. When the user moves the elbow joint, a relative displacement of the two fixing members 5 occurs, and accordingly the beam 4 makes bending displacement and/or torsion displacement.

The FBG sensor 1 is attached to the surface of the beam 4 (see FIG. 3) or attached to the inner periphery of the beam 4 through the inside of the hollow beam 4. Accordingly, the FBG sensor 1 makes bending displacement and/or torsion displacement in response to the bending motion and/or the twisting motion of the beam 4.

Parts of the optical fiber 11 extending to the left and right sides of the sensing unit 16 may be allowed to cause any displacement, but to separate and measure only the twisting movement of the elbow joint, according to this embodiment, at least the bending displacement of the sensing unit 16 is restricted through the bending prevention member 3.

Although not shown in the drawings, the FBG sensor 1 passes through the beam 4 via a hole formed in the beam 4 outside of the bending prevention member 3 and extends out of the beam 4 through another hole formed in the beam 4 inside of the bending prevention member 3.

In this instance, the sensing unit 16 of the FBG sensor 1 is disposed within the bending prevention member 3.

The bending displacement of the sensing unit 16 is prevented by the bending prevention member 3 that wraps around the sensing unit 16. The bending prevention member 3 is disposed in the middle of the beam 5, and preferably the bending prevention member 3 and the sensing unit 16 are positioned at a corresponding location to a measurement location, for example, the location of the elbow joint.

Figure 3:
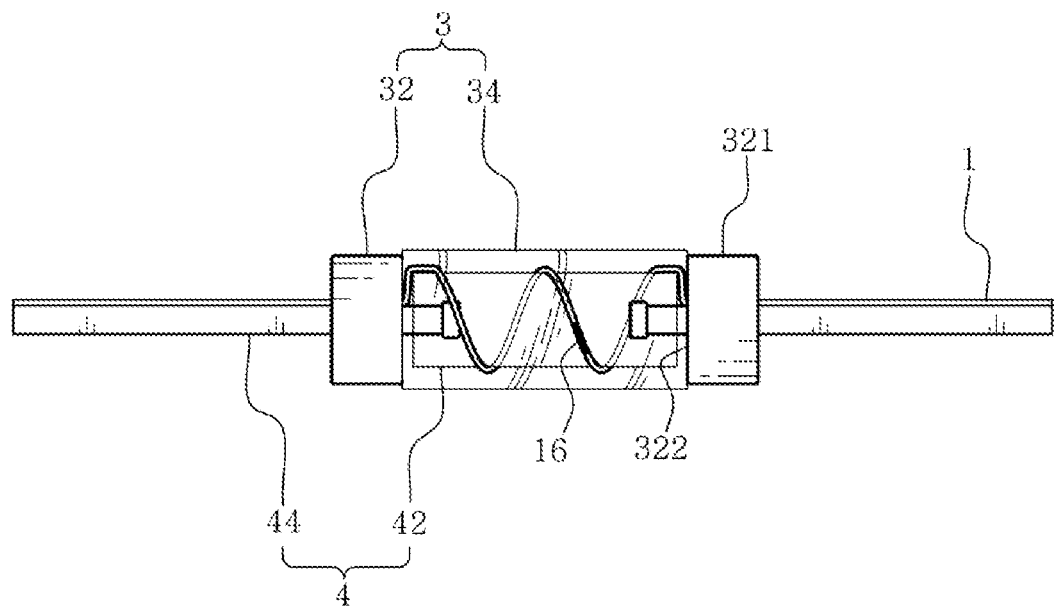
FIG. 3 is a partial enlarged diagram of the torsion sensor device of FIG. 2.
Figure 4:
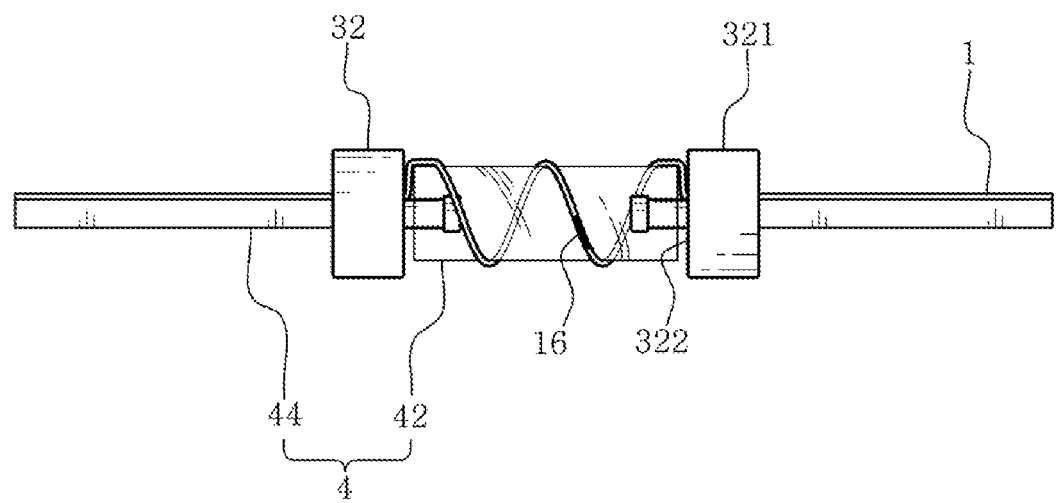
FIG. 4 is a diagram in which a reinforcer is omitted from FIG. 3.

FIG. 3 is a partial enlarged diagram of the torsion measuring sensor 100 of FIG. 2, and FIG. 4 is a diagram in which a reinforcer 34 is omitted from FIG. 3.

The bending prevention member 3 includes two supports 32 to support the FBG sensor 1 to allow a twisting motion of the beam 4 to cause torsion displacement of the FBG sensor 1, and the reinforcer 34 connecting the two supports 32 to prevent a relative bending movement between the two supports 32.

The reinforcer 34 according to this embodiment is a tube that completely wraps around the FBG sensor 1, and the support 32 is a ball bearing. An inner ring 322 of the ball bearing is engaged with and fixed to the beam 4, and an outer ring 321 of the ball bearing 32 is fixed to two ends of the reinforcer 34.

The reinforcer 34 according to this embodiment may be formed from various types of materials such as metals or polymers, but has sufficient strength and length to avoid bending displacement by the movement of the human body.

Accordingly, the bending prevention member 3 including the reinforcer 34 and the supports 32 connected to the reinforcer 34 does not cause bending displacement in any direction by the movement of the measurement object. Additionally, the sensing unit 16 of the FBG sensor 1 covered with the bending prevention member 3 does not cause bending displacement.

On the other hand, the beam 4 fixed to the inner ring 322 capable of rotating relative to the outer ring 321 is allowed to make a twisting motion, so that the sensing unit 16 fixed to the beam 4 is allowed to cause torsion displacement.

The reinforcer 34 may be formed in the shape of, for example, at least one bar connecting the two supports 32 to prevent a relative bending movement between the supports 32, but may have a tube shape, thereby preventing the bending displacement of the FBG sensor 1 irrespective of the movement direction of the measurement object.

The supports 32 may include a variety of components which support the ball bearing as well as the beam 4 but do not interrupt the twisting motion of the beam 4.

As shown in FIGS. 3 and 4, the sensing unit 16 of the FBG sensor 1 is spirally wound on the outer periphery of the beam 4 passing through the bending prevention member 3. The FBG sensor 1 includes the spirally positioned sensing unit 16 to cause greater displacement to occur in the sensing unit 16 by the torsion of the beam 4, thereby inducing a sufficient amount of wavelength change necessary to measure.

According to this embodiment, when the FBG sensor 1 is wound on a torsion beam 42 under tension applied to the FBG sensor 1, the sensing unit 16 has a wider grating interval in a little further stretched state than when tension is not applied. The grating interval in this state is set as the initial state by the torsion sensor device 1.

When the beam 4 is twisted in the direction in which the sensing unit 16 is wound as the elbow joint moves in a direction, the sensing unit 16 on the torsion beam 42 is extended and the grating interval increases. On the contrary, when the beam 4 is twisted in the opposite direction to the direction in which the sensing unit 16 is wound as the elbow joint moves in a different direction, the sensing unit 16 on the torsion beam 42 is compressed and shrinks by the elastic recovery, and the grating interval decreases.

When the grating interval increases, the wavelength change direction is positive, and when the grating interval decreases, the wavelength change direction is negative. Accordingly, the torsion direction of the measurement object may be identified through the wavelength change direction (sign).

Further, it is possible to measure the degree of torsion of the beam 4 (i.e., the degree of torsion of the measurement object) through the grating interval changes.

For example, the torsion displacement of the sensing unit 16 and the twisting motion of the beam 4 have a relationship of the following [Equation 2].

$$\Delta\Lambda = \sqrt{1 + \left(\frac{\pi d(\Delta\delta)}{3601}\right)^2} \qquad \text{[Equation 2]}$$

In [Equation 2], $\Delta\Lambda$ denotes the torsion displacement of the sensing unit 16 attached to the circular beam 4, d denotes the diameter of the circular beam to which the FBG sensor is attached, l denotes the length of the circular beam to which the FBG sensor is attached, and $\Delta\delta$ denotes the torsion angle of the circular beam to which the FBG sensor is attached. When the grating interval is known, the torsion angle of the beam 4 will be found.

The torsion angle of the beam 4 and the degree of torsion of the measurement object have a proportional relationship, and thus the degree of torsion of the measurement object may be inferred and calculated through the torsion angle of the beam 4.

The winding number, winding shape and winding angle in which the FBG sensor 1 is wound on the torsion beam 42 may be appropriately adjusted by the use and size of the sensor device.

Meanwhile, the beam 4 according to this embodiment includes a torsion beam 42 to fix the sensing unit 16 of the FBG sensor 1 and an extension beam 44 extending from two ends of the torsion beam 42 to fix the FBG sensor 1 outside of the bending prevention member 3.

As shown, the torsion beam 42 is formed with a larger diameter than the extension beam 44. The torsion beam 42 has the diameter sufficient to prevent the FBG sensor 1 from coming into contact with the reinforcer 34 within the bending prevention member 3.

According to this embodiment, the torsion beam 42 is formed from a material having flexibility, for example, a polymer material, and the extension beam 44 is formed from a material having stiffness, for example, a metal.

Accordingly, according to this embodiment, when the measurement object makes a twisting motion, the two extension beams 44 are not twisted itself and rotate relative to each other, and they serve to transmit torque to the torsion beam 42. That is, according to this embodiment, it is the torsion beam 42 where substantial torsion displacement occurs in the beam 4.

As described above, it will be understood that the twisting motion of the beam 4 includes not only torsion displacement of the entire beam 4 but also torsion displacement of at least part of the beam 4.

The embodiments of the present disclosure allow only the torsion beam 42 disposed at a measurement region, such as elbow joints, to substantially cause torsion displacement, so that the grating interval of the sensing unit 16 may change immediately in response to the movement of the measurement object. Thereby, it is possible to reduce measurement errors, compared to the case in which the entire elongated beam 4 makes torsion displacement.

As in this embodiment, when the sensing unit 16 is spirally positioned on the surface of the torsion beam 42 having a larger diameter, the diameter d of the circular beam increases in the above [Equation 2]. For the same amount of wavelength change, it is possible to calculate the torsion angle $\Delta\delta$ more precisely, resulting in the improved resolution of the sensor device.

Meanwhile, to calculate the degree of torsion of the measurement object through the torsion angle of the beam 4, the sensing unit 16 and the torsion beam 42 are brought into contact with the measurement object as closely as possible.

When the beam 4 is constrained by the fixing member 5 with the two fixing members 5 being fixed to the measurement object, as the beam 4 bends along the bending movement direction of the measurement object, the sensing unit 16 and the torsion beam 42 may grow apart from the measurement object.

Figure 5:
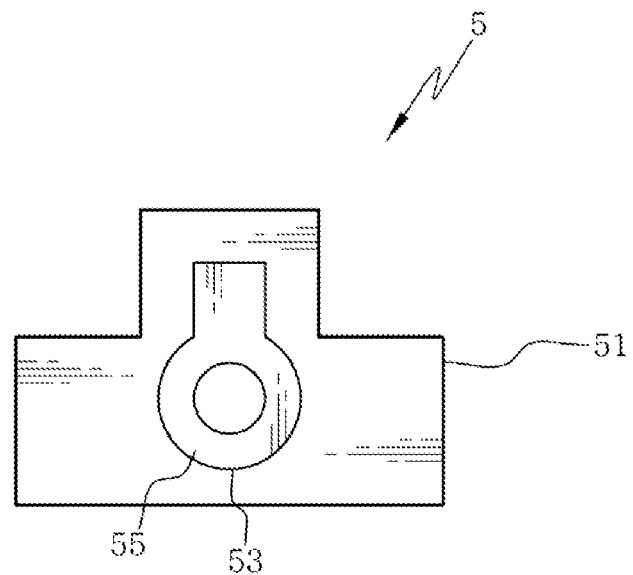
FIG. 5 is a diagram showing a fixing member of the torsion sensor device of FIG. 2.

FIG. 5 is a diagram illustrating the structure of the fixing member 5 according to an embodiment of the present disclosure.

The fixing member 5 according to this embodiment includes a fixture 51 attached to the measurement object, and a key member 55 which is inserted into a slit 53 formed in the fixture 51.

The key member 55 is fixed to the end of the extension beam 44. The key member 55 may be inserted into the slit 53 formed in the fixture 51, and may slidably move in the slit 53.

Figure 6:
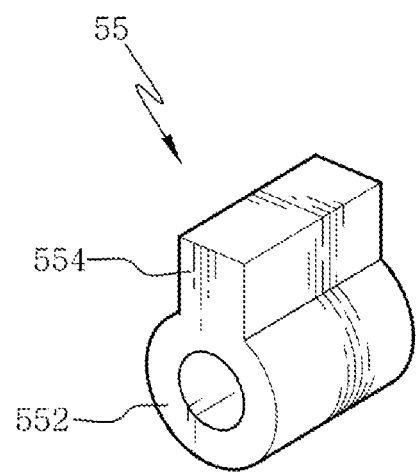
FIG. 6 is a perspective view of a key member of the fixing member of FIG. 5.

FIG. 6 is a perspective view of the key member 55 according to an embodiment.

The key member 55 includes a body part 552 fixed to the extension beam 44 and a rotation prevention part 554 protruding from one side of the body part 552. The slit 53 is formed to conform to the shape of the key member 55.

For accurate measurement, when the fixing member 5 moves with the movement of the measurement object, the beam 4 also moves in response to the movement. If the beam 4 rotates uselessly relative to the fixing member 5 when the fixing member 5 moves, an accurate twisting motion is not transmitted.

According to this embodiment, with the rotation prevention part 554, the key member 55 does not rotate relative to the fixture 51, so that a twisting force (for example, torque) by the twisting motion of the measurement object may be accurately transmitted to the beam 4.

The key member 55 does not need to have a key shape of which part is protruding, and may be formed with a structure in which an angled edge or a protrusion acts as the rotation prevention part to prevent the relative rotation to the fixture 51.

Figure 7:
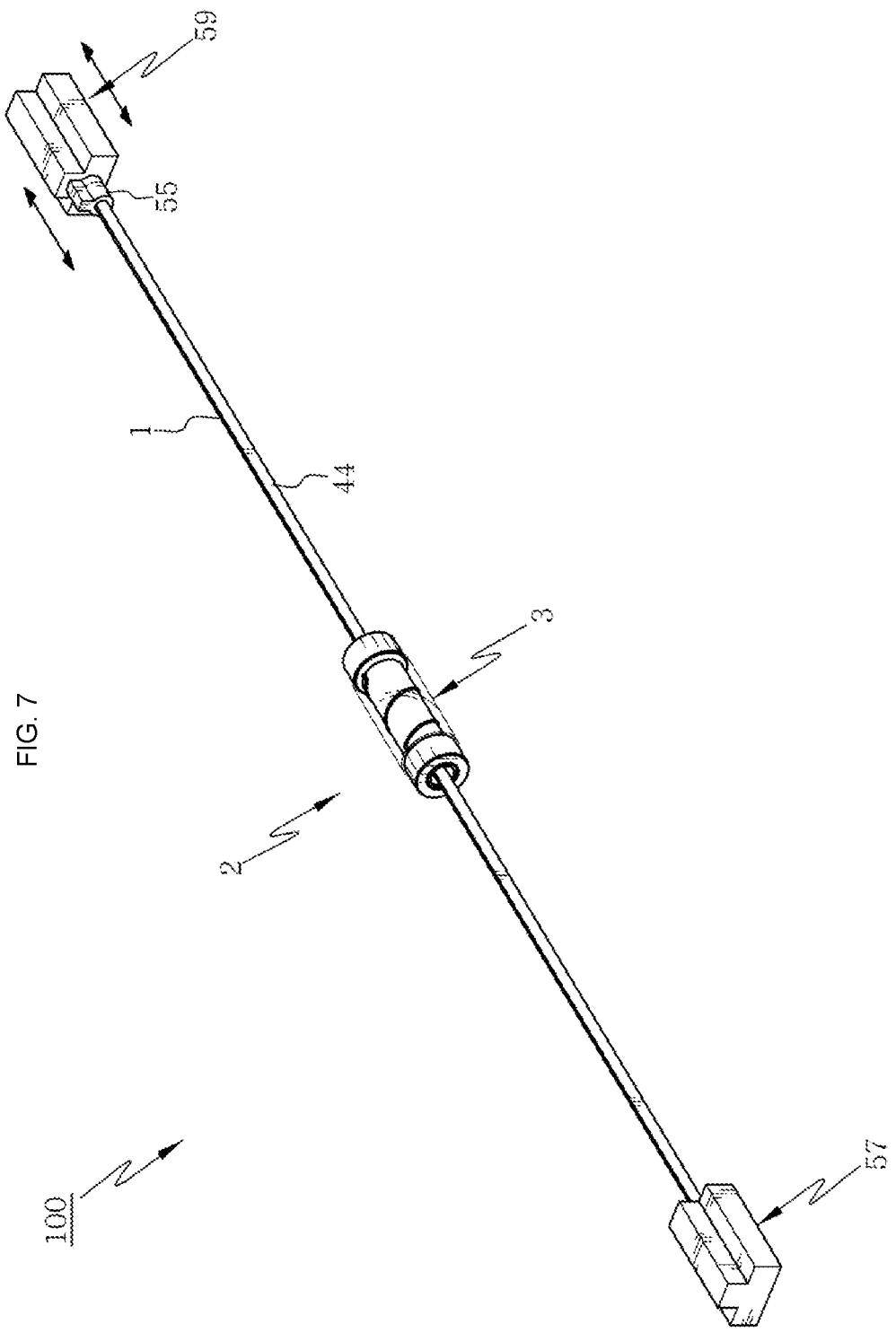
FIG. 7 is a diagram illustrating the fixed state of two ends of the torsion sensor device of FIG. 2.

FIG. 7 is a diagram illustrating the fixed state of the two ends of the torsion sensor device 1.

According to this embodiment, a first fixing member 57 fixed to one end of the extension beam 4 is fixed not to move relative to the extension beam 4. On the other hand, a second fixing member 59 fixed to the other end of the extension beam 4 has a structure in which the above-described key member is slidably moveable relative to the fixture and is not fixed to the extension beam 4.

The first fixing member 57 may have a different structure from the second fixing member 59, and may have the same structure as the second fixing member 59, but the key member 55 may be fixed to the fixture 51 to disallow it to slidably move.

As shown in FIG. 7, when the measurement object makes bending displacement, the key member 55 of the second fixing member 59 is not fixed to the fixture 51 of the second fixing member. Thereby, the key member 55 of the second fixing member 59 slidably moves on the slit 53 of the second fixing member 59.

As a result, even when the measurement object does a great bending action, the bending displacement of the beam 4 is minimized. It is possible to prevent the factors such as shear forces applied to the two ends of the beam 4 from affecting the torsion displacement of the FBG sensor 1, and keep the sensing unit 16 in close contact with the measurement object.

Figure 8:
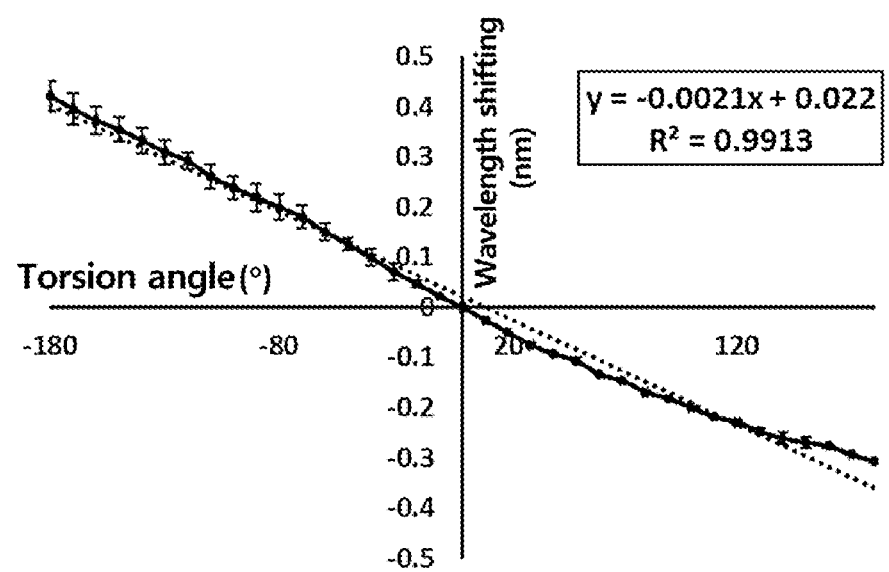
FIG. 8 is a graph showing experimental data of torsion angle of beam-change in wavelength acquired using the FBG sensor device of FIG. 2.

FIG. 8 is a graph showing experimental data of the torsion angle of the beam-change in wavelength acquired using the FBG sensor device 100.

As shown in FIG. 8, the torsion sensor device 100 may have the resolution having torsion displacement of about 2.1 pm per 1° torsion angle of the beam. This is only the experimental results, and the resolution of the torsion sensor device may be adjusted by designing the dimensions of the beam based on [Equation 1] and [Equation 2]. Additionally, when the fabricated torsion sensor device fails to measure a twisting motion of the measurement object, the problem can be solved by designing the beam again without needing to fabricate the entire device again.

Although the present disclosure shows and describe the preferred embodiments, the present disclosure is not limited to particular embodiments, and a variety of variations may be made by those skilled in the art without departing from the claimed subject matter set forth in the appended claims and such variations should not be individually understood from the technical spirit or scope of the present disclosure.

INDUSTRIAL APPLICABILITY

There is an increasing demand for robots in various fields all over the world. In particular, there is a demand for jointless robots (for example, flexible endoscopic robots, snake robots), but to measure the accurate performance of the robots, it is necessary to measure torsion of the corresponding robots.

In addition, with the development of virtual reality and market expansion, to fabricate more precise motion sensors, it is necessary to measure torsion of motion measurement objects.

Accordingly, it is expected that the embodiments of the present disclosure will be used in a wide range of applications in the field of robotics and motion sensors.

The invention claimed is:

1. A torsion sensor device which measures a degree of torsion of a measurement object by using a fiber Bragg grating (FBG) sensor, the torsion sensor device comprising:
   an FBG sensor including a sensing unit formed in one section of an optical fiber; and
   a fixing device for fixing and supporting the FBG sensor to cause displacement of the FBG sensor according to motion of the measurement object,
   wherein the fixing device includes a bending prevention member to enable the sensing unit to have torsion displacement without bending displacement, according to the motion of the measurement object,
   wherein the bending prevention member includes: two supports to support the FBG sensor to allow the torsion displacement of the sensing unit; and a reinforcer connecting the two supports to prevent a relative bending movement between each support,
   wherein the fixing device further includes a beam to which the FBG sensor is attached, wherein the beam makes a twisting motion in response to a twisting movement of the measurement object, and the beam is positioned across the two supports and fixed to the supports, and
   wherein the support is a ball bearing, the beam is fixed to an inner ring of the ball bearing, and the reinforcer is fixed to an outer ring of the ball bearing.

2. The torsion sensor device according to claim 1, wherein the reinforcer is a tube which wraps around the sensing unit.

3. The torsion sensor device according to claim 1, wherein the sensing unit is spirally wound on an outer periphery of the beam between the supports.

4. The torsion sensor device according to claim 3, wherein the beam includes:
   a torsion beam on which the sensing unit is spirally wound; and
   an extension beam extending from two ends of the torsion beam to fix the FBG sensor, and
   wherein the torsion beam is formed with a larger diameter than the extension beam.

5. The torsion sensor device according to claim 1, wherein the fixing device further includes a fixing member disposed at two ends of the beam and attached to the measurement object to fix the torsion sensor device to the measurement object.

6. The torsion sensor device according to claim 5, wherein the fixing member includes:
   a fixture which is fixed to the measurement object; and
   a key member which is inserted into a slit formed in the fixture.

7. The torsion sensor device according to claim 6, wherein the key member includes:

a body part to which the beam is fixed; and a rotation prevention part to prevent the key member from rotating relative to the fixture.

8. The torsion sensor device according to claim 5, wherein the fixing members formed at the two ends of the beam include a first fixing member fixed to the beam, and a second fixing member not fixed to the beam so that the beam slidably moves relative to the second fixing member.

* * * * *